(12) United States Patent
Kehoe et al.

(10) Patent No.: US 7,199,877 B2
(45) Date of Patent: Apr. 3, 2007

(54) SCALABLE IMAGING SPECTROMETER

(75) Inventors: Michael R. Kehoe, Bozeman, MT (US); Casey W. Smith, Bozeman, MT (US); Rand C. Swanson, Bozeman, MT (US)

(73) Assignee: Resonon Inc., Bozeman, MT (US)

( * ) Notice: Subject to any disclaimer, the term of this patent is extended or adjusted under 35 U.S.C. 154(b) by 73 days.

(21) Appl. No.: 11/187,584

(22) Filed: Jul. 22, 2005

(65) Prior Publication Data

US 2006/0082772 A1    Apr. 20, 2006

Related U.S. Application Data

(63) Continuation-in-part of application No. 10/998,110, filed on Nov. 26, 2004, now abandoned.

(60) Provisional application No. 60/620,433, filed on Oct. 20, 2004.

(51) Int. Cl.
*G01J 3/28* (2006.01)

(52) U.S. Cl. ........................ 356/328; 356/305

(58) Field of Classification Search ................ 356/305, 356/326, 328, 334
See application file for complete search history.

(56) References Cited

U.S. PATENT DOCUMENTS

| | | | |
|---|---|---|---|
| 2,922,331 A | 1/1960 | Fastie et al. | |
| 3,255,664 A | 6/1966 | Smith | |
| 3,748,015 A | 7/1973 | Offner | |
| 4,634,276 A | 1/1987 | Sharpe | |
| 4,743,112 A | 5/1988 | Burke | |
| 5,305,082 A | 4/1994 | Bret | |
| 5,627,686 A | 5/1997 | Ohshita | |
| 5,880,834 A | 3/1999 | Chrisp | |
| 6,552,788 B1 | 4/2003 | Castle | |
| 6,734,966 B2 | 5/2004 | McCarthy | |

OTHER PUBLICATIONS

Bowyer, S., et al., "Very High Sensitivity Extreme Ultraviolet Spectrometer For Diffuse Radiation," The Astrophysical Journal, Aug. 20, 1997, pp. 523-532, vol. 485.
Sinclair, M., et al., "Design, Construction, Characterization and Application of a Hyperspectral Microarray Scanner," Applied Optics, Apr. 1, 2004, pp. 2079-2088, vol. 43, No. 10.
U.S. Appl. No. 60/620,433 for Michael R. Kehoe, et al. entitled "Scalable Imaging Spectrometer," filed Oct. 20, 2004.
U.S. Appl. No. 10/998,110 for Michael R. Kehoe, et al. entitled "Scalable Imaging Spectrometer," filed Nov. 26, 2004.

*Primary Examiner*—F. L. Evans
(74) *Attorney, Agent, or Firm*—Altera Law Group, LLC

(57) ABSTRACT

A scalable imaging spectrometer, using anamorphic optical elements to form an intermediate focus in only one dimension. Light reflects off an object to form an incident beam. The beam reflects off an anamorphic objective mirror to form a line focus at a slit. At the slit, the beam is focused along the spectral dimension, but remains substantially collimated along the spatial dimension. The beam is then recollimated in the spectral dimension by a second anamorphic mirror, reflects off a diffraction grating, passes through a lens, and is brought to focus on a two dimensional detector, which produces both spectral and spatial information about the object. Because there is no intermediate focus in the spatial dimension, there are no off-axis aberrations from the anamorphic mirrors, and the field of view may be substantially increased over prior art spectrometers in the spatial dimension.

38 Claims, 8 Drawing Sheets

| DEVICE | TYPE OF OPTICAL ELEMENT ON EITHER SIDE OF SLIT | DIMENSION | BROUGHT TO A FOCUS IN DIMENSION? | RELATIVE FIELD OF VIEW IN DIMENSION | OFF-AXIS ABERRATIONS IN DIMENSION | ABERRATIONS INTRODUCED BY SHRINKING SIZE |
|---|---|---|---|---|---|---|
| KNOWN SYSTEM | ROTATIONALLY SYMMETRIC | SPECTRAL | YES | SMALL | INSIGNIFICANT | SIGNIFICANT |
| | | SPATIAL | YES | LARGE | SIGNIFICANT | |
| SYSTEM OF FIGS. 1-4 | ANAMORPHIC | SPECTRAL | YES | SMALL | INSIGNIFICANT | LESS SIGNIFICANT |
| | | SPATIAL | NO | LARGE | LESS SIGNIFICANT | |

Fig. 5

SCALABLE IMAGING SPECTROMETER

CROSS-REFERENCES TO RELATED APPLICATIONS

This application claims the benefit of U.S. Provisional Application No. 60/620,433, filed Oct. 20, 2004 (Kehoe et al., "Scalable imaging spectrometer"), which hereby is incorporated herein in its entirety by reference thereto. This patent is also a continuation-in-part of and claims the benefit of U.S. patent application Ser. No. 10/998,110 filed Nov. 26, 2004 now abandoned (Kehoe et al., "Scalable imaging spectrometer"), which hereby is incorporated herein in its entirety by reference thereto.

GOVERNMENT LICENSE RIGHTS

The U.S. Government has a paid-up license in this invention and the right in limited circumstances to require the patent owner to license others on reasonable terms as provided for by the terms of Contract No. FA8650-04-M-1652 awarded by the United States Air Force.

BACKGROUND OF THE INVENTION

1. Field of the Invention

The present invention is directed to imaging spectrometers, and more particularly to scalable imaging spectrometers.

2. Description of the Related Art

A spectrometer measures the spectrum, or wavelength distribution, of a particular light beam. The light beam may be generated by a light source, or may be reflected from a sample or object. In one typical application, a spectrometer is flown in an aircraft and analyzes the light reflected from a distant object on the ground. The incident light beam, which is essentially collimated upon entering the spectrometer, strikes a dispersive optical element such as a diffraction grating or prism, which redirects each spectral component of the beam with a slightly different propagation angle. The spectrally divergent beam is then focused onto a one-dimensional array of detector elements or pixels, with the output from each pixel corresponding to an optical power in a particular spectral range.

Spectrometers are also useful in near-field applications. A typical near-field application is the fluorescence imaging of a material sample. The sample may be illuminated externally, or may not require any external illumination. Regardless of how the sample is lit, light from the sample is collimated before it strikes the dispersive optical element, and continues to pass through the spectrometer in essentially the same manner as described above.

These spectrometers that use one-dimensional arrays generally cannot capture any spatial information about the particular light beam and therefore generate only spectral information.

A class of spectrometers known as imaging spectrometers, or hyperspectral imagers, has been developed that uses a two-dimensional array of detector elements or pixels, such as a CCD array, rather than a one-dimensional array. An important subset of these imaging spectrometers are so-called "push-broom" imaging spectrometers, which image a long, thin section of the object of interest off a dispersive element, such as a diffraction grating, onto a two-dimensional focal plane array. This approach provides a detailed spectrum for each "pixel" of the long, thin region per frame. The spatial information in the second dimension is then obtained by scanning the array across the object and correlating subsequent one-dimensional images obtained by the CCD army over a period of time. Note that data in three dimensions is thus obtained by a scanned push-broom imaging spectrometer—two spatial dimensions of an object plus the spectrum for each recorded pixel.

When a push-broom imaging spectrometer is designed for use in an aircraft, scanning is accomplished typically by flying the imaging spectrometer over the object. Given the heights at which aircraft typically fly (greater than say, 100 meters), the light reflected from an object on the ground may be considered essentially collimated. Light rays leaving a point on the object on the ground are, therefore, essentially parallel upon reaching the imaging spectrometer as it flies overhead.

In a typical push-broom imaging spectrometer, an objective lens or mirror brings the essentially parallel rays to a focus, forming an internal image of the distant object. The internal image is located on a slit, which transmits only a narrow portion of the image and blocks everything else. Note that in general, an aperture located at an internal image acts as a field stop for the optical system, allowing only rays from certain portions of the object to pass through the system. For the push-broom imaging spectrometer, the slit functions as a field stop, allowing rays from only a thin slice of the object to pass through the spectrometer at any one time. The slit is generally oriented perpendicular to the scan direction, i.e., the direction in which the plane flies.

After passing through the slit, the light diverges and strikes a curved diffraction grating, which focuses the light onto a two-dimensional array of detector elements, such as a CCD camera. Alternatively, the light diverging from the slit first is collimated by a lens or mirror, then strikes a flat or curved diffraction grating, then is focused by a lens or mirror onto a two-dimensional array of detector elements, such as a CCD camera. In the alternate arrangements, the multiple reflections or lenses may allow for flattening of the optical field at the CCD camera, allowing for sharp imaging at both the center and the edges of the CCD pixel array.

The grating lines are generally oriented parallel to the slit, and the grating is generally optimized to maximize its output into a particular diffracted order. At the CCD array, the spectral information is obtained along an axis perpendicular to the grating lines, and the spatial information is obtained along an axis parallel to the grating lines.

In most imaging spectrometers to date, a rotationally symmetric focusing optic is used on both sides of the slit. Consequently, the beam is brought to a focus at the slit in both the spectral and spatial dimensions. For example, a device commonly known as an Offner imaging spectrometer is disclosed in U.S. Pat. No. 5,880,834, issued Mar. 9, 1999 to Michael P. Chrisp, and utilizes rotationally symmetric focusing optics on both sides of the slit. An example of a predominantly lens-based imaging spectrometer is disclosed in U.S. Pat. No. 6,734,966, issued May 11, 2004 to James K. McCarthy. An example of a more traditional mirror-based spectrometer is disclosed in U.S. Pat. No. 5,305,082, issued Apr. 19, 1994 to Georges G. Bret. Other examples using simpler technology are disclosed in U.S. Pat. No. 2,922,331, issued Jan. 26, 1960 to William G. Fastie et al., and U.S. Pat. No. 4,743,112, issued May 10, 1988 to Elliot M. Burke.

In the spectral dimension, the field of view is kept relatively small so that the range of incident angles on the grating is tightly constrained, and this relatively small field of view effectively eliminates the off-axis aberrations in the spectral dimension.

In the spatial dimension, where the field of view does not significantly affect the spectral resolution of the grating, the field of view is increased significantly beyond the spectral dimension. In fact, in many cases it is desirable to have a large field of view in the spatial dimension, so that when the spectrometer is flown overhead, a large portion of the ground may be imaged by a single overhead pass of the aircraft. As the field of view increases, however, off-axis aberrations, both in the focusing optic and in the downstream spectral dispersive module of the system, generate increasingly large image blur and limit the performance of the spectrometer.

Because the spectrometer is typically flown in an aircraft, its size is important. For example, use in a small, uninhabited aerial vehicle (UAV) may require that the spectrometer be scaled down to a fraction of its typical size. Such scaling poses a variety of problems in performance.

For instance, if all the components of a spectrometer are proportionately reduced in size by a factor of 3, then the amount of light reaching the detector, or throughput, is reduced by a factor of 9. In general, such a reduction in throughput unacceptably reduces the signal-to-noise ratio of the detectors. Therefore, as a practical matter in reducing the size of the spectrometer, some components are preferably shrunk more than others, rather than reducing the size of everything in proportion.

One condition that maintains an acceptable throughput is that the entrance pupil diameter is left constant while the focal lengths of the optical elements are reduced, along with the distances between components. This results in a higher numerical aperture (NA) and, equivalently, a lower F-number (f/#). This increased NA increases the off-axis aberrations of the system, most notably at the edge of the field of view. Although one might be tempted to therefore reduce the field of view to compensate for the increase in NA, in order to reduce the off-axis aberrations in the system, in general this is unacceptable, as it is a compromise in performance.

In other words, the problem encountered with scaling down a spectrometer design is as follows. The field of view should not be scaled down, as it is generally a design specification. The entrance pupil diameter should not be scaled down either, as it determines the throughput of the system. The focal lengths of and distances between optical elements should be scaled down, resulting in a higher NA, and therefore an increased sensitivity to off-axis and other aberrations.

Hence, there exists a need for an imaging spectrometer with reduced off-axis aberrations, which would allow for its design to be scaled down without sacrificing either field of view or throughput.

BRIEF SUMMARY OF THE INVENTION

One embodiment of the present invention is a device for generating spectral information over an elongated portion of an object, comprising: means for forming an anamorphic beam corresponding to a slice of the object, the anamorphic beam being generally focused within a slit in a first dimension, and generally collimated within the slit in a second dimension; means for forming a multi-wavelength substantially collimated beam from the anamorphic beam; means for forming a spectrally divergent focused beam from the multi-wavelength substantially collimated beam; and means for sensing the spectrally divergent focused beam in the first and second dimensions, wherein the first dimension comprises primarily spectral information about the object slice, and the second dimension comprises primarily spatial information about the object slice.

A further embodiment is a method of generating spectral information over an elongated portion of an object, comprising: forming an anamorphic beam corresponding to a slice of the object, the anamorphic beam being generally focused within a slit in a first dimension, and generally collimated within the slit in a second dimension; forming a multi-wavelength substantially collimated beam from the anamorphic beam; forming a spectrally divergent focused beam from the multi-wavelength substantially collimated beam; and sensing the spectrally divergent focused beam in the first and second dimensions, wherein the first dimension comprises primarily spectral information about the object slice, and the second dimension comprises primarily spatial information about the object slice.

A further embodiment is a method of generating spectral information over an elongated portion of an object, comprising: applying an incident beam containing spatial and spectral information about a slice of the object to an anamorphic objective element to form a first anamorphic beam; passing the first anamorphic beam through a slit to form a second anamorphic beam corresponding to the object slice, the first anamorphic beam being generally focused within the slit in a first dimension, and generally collimated within the slit in a second dimension; applying the second anamorphic beam to an anamorphic recollimating element to form a multi-wavelength substantially collimated beam; forming a spectrally divergent focused beam from the multi-wavelength substantially collimated beam; and sensing the spectrally divergent focused beam in the first and second dimensions, wherein the first dimension comprises primarily spectral information about the object slice, and the second dimension comprises primarily spatial information about the object slice.

A further embodiment is an imaging spectrometer, comprising: an anamorphic objective element for forming an anamorphic beam from an incident beam, the anamorphic objective element having an anamorphic intermediate focus; a substantially opaque screen having an elongated slit disposed substantially coincident with the anamorphic intermediate focus for screening the anamorphic beam; an anamorphic recollimating element for forming a multi-wavelength substantially collimated beam from the screened anamorphic beam; a diffraction grating for forming a spectrally divergent collimated beam from the multi-wavelength substantially collimated beam, the diffraction grating having grating lines substantially parallel to the elongated slit; a focusing unit for forming a spectrally divergent focused beam from the spectrally divergent collimated beam, the focusing unit having a rear focal plane; and a two dimensional sensor disposed at the rear focal plane of the focusing unit for receiving the spectrally divergent focused beam, a first one of the dimensions being oriented perpendicular to the grating lines to obtain spectral information about the incident beam, and a second one of the dimensions being oriented parallel to the grating lines to obtain spatial information about the incident beam.

A further embodiment is an imaging spectrometer, comprising: an anamorphic objective element having an anamorphic intermediate focus; a substantially opaque screen having an elongated slit disposed substantially coincident with the anamorphic intermediate focus; an anamorphic recollimating element optically coupled to the anamorphic objective element through the elongated slit of the screen; a diffraction grating optically coupled to the anamorphic recollimating element, the diffraction grating having grating lines substantially parallel to the elongated slit of the screen; a focusing unit optically coupled to the diffracting grating and having a rear focal plane; and a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

A further embodiment is an imaging spectrometer, comprising: an anamorphic objective element having an anamorphic intermediate focus; a substantially opaque screen having an elongated slit disposed substantially coincident with the anamorphic intermediate focus; an anamorphic recollimating element optically coupled to the anamorphic objective element through the elongated slit of the screen; a curved diffraction grating optically coupled to the anamorphic recollimating element, the curved diffraction grating having grating lines substantially parallel to the elongated slit of the screen, and further having a rear focal plane; a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

A further embodiment is an imaging spectrometer, comprising: an anamorphic objective element having an anamorphic intermediate focus; a substantially opaque screen having an elongated slit disposed substantially coincident with the anamorphic intermediate focus; an anamorphic diffraction grating optically coupled to the anamorphic objective element through the elongated slit of the screen, the anamorphic diffraction grating having grating lines substantially parallel to the elongated slit of the screen; a focusing unit optically coupled to the anamorphic diffracting grating and having a rear focal plane; and a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

A further embodiment is a spectrometer for imaging an object, comprising: a first optical path for light from the object; an anamorphic objective element disposed in the first optical path for forming a first anamorphic beam from the light from the object, the anamorphic objective element having an anamorphic intermediate focus in a first dimension; a second optical path for the first anamorphic beam; an elongated slit generally disposed at the anamorphic intermediate focus in the second optical path for forming a second anamorphic beam corresponding to a slice of the object from the first anamorphic beam; a third optical path for the second anamorphic beam; an optical subsystem disposed in the third optical path for forming a focused beam from the second anamorphic beam, the focused beam being spectrally divergent and having primarily spectral information about the object slice in a first dimension, and having primarily spatial information about the object slice in a second dimension, the optical subsystem comprising an anamorphic recollimating element disposed in the third optical path for forming a multi-wavelength substantially collimated beam from the second anamorphic beam; a fourth optical path for the focused beam; and a sensor disposed in the fourth optical path, the sensor having a first dimension for sensing the spectral information in the first dimension of the focused beam, and having a second dimension for sensing the spatial information in the second dimension of the focused beam.

BRIEF DESCRIPTION OF THE SEVERAL VIEWS OF THE DRAWINGS

FIG. 5 is a table summarizing the optical performance of the imaging spectrometer of FIG. 1.

DETAILED DESCRIPTION OF THE INVENTION

Figure 1:
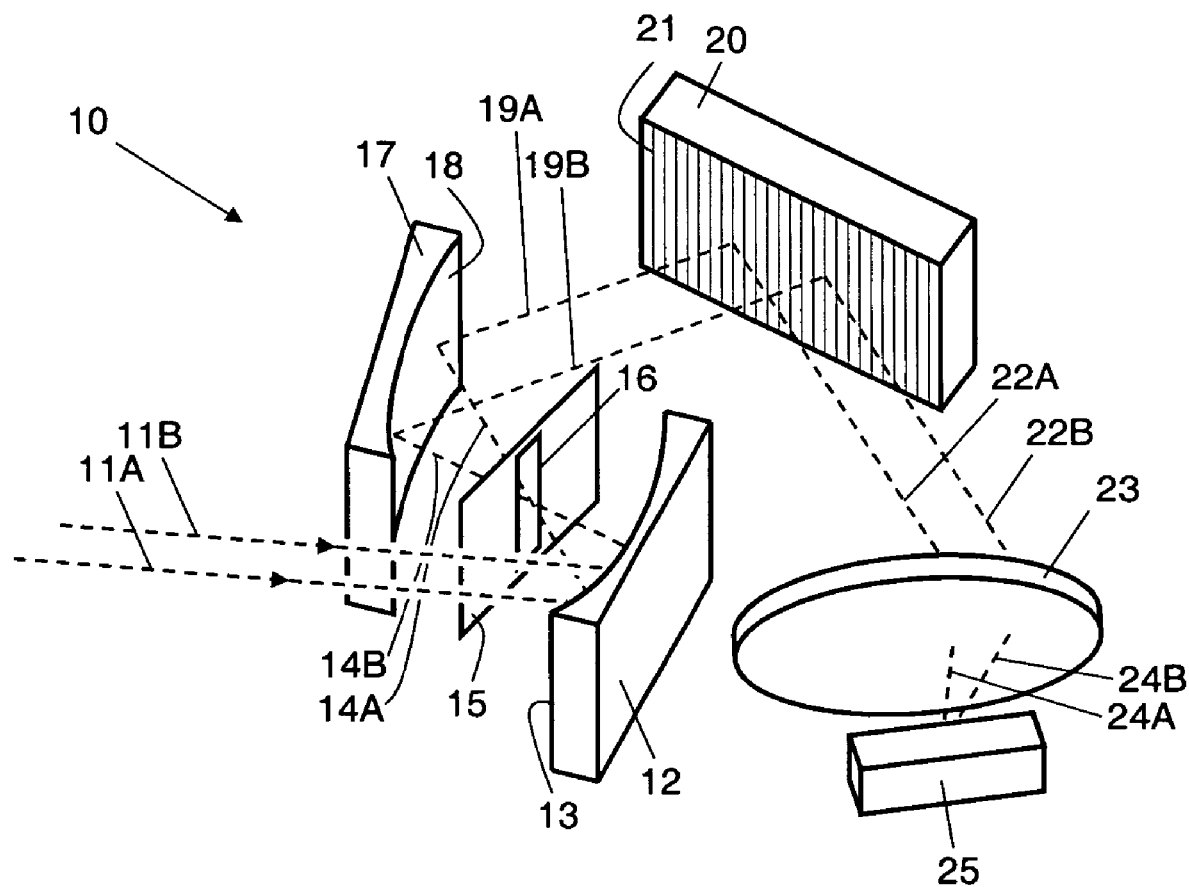
FIG. 1 is a perspective drawing of an imaging spectrometer that uses anamorphic optical elements.

FIG. 1 is a perspective drawing of a scalable imaging spectrometer 10 that uses anamorphic optical elements and has reduced off-axis aberrations.

The imaging spectrometer 10 is commonly used for detection and analysis of relatively distant objects. For instance, the imaging spectrometer is commonly housed in an aircraft or UAV and may be flown over an object to be analyzed, which may be referred to as an object under test. The object under test is generally tested using ambient solar illumination, although thermal radiation or a specifically designed illumination system may also be used. Because the distance to the object under test is generally relatively large, say, greater than 100 meters, the rays arriving at the spectrometer from the object may be considered effectively collimated. In other words, rays originating from a common point on the distant object are essentially parallel when they reach the spectrometer.

The imaging spectrometer 10 may also be used for detection and analysis of relatively near objects, provided the divergent rays from the near object are collimated before they reach the spectrometer or by supplemental optics at the front end of the spectrometer.

Two such rays 11A and 11B are shown in FIG. 1. The two rays 11A and 11B originate at a common point on the distant object, and each ray is composed of a plurality of wavelengths corresponding to the spectral composition of the point on the object. Note that the distance to the object is sufficiently large so that all the rays originating from a particular object point are effectively parallel upon reaching the spectrometer, so that no collimating optics are required. Rays originating from different object points have an angle between them. As drawn in FIG. 1, rays 11A and 11B originate from the same point on the distant object so that they are parallel to each other, although it will be understood that rays with other field angles may also enter the spectrometer.

The rays 11A and 11B leave the distant object (not shown) and strike an objective mirror 12. In contrast with imaging spectrometers that use rotationally symmetric objective elements such as standard camera lenses, microscope objectives or mirrors with optical power along both dimensions, the objective mirror 12 is cylindrical in nature. Specifically, the reflecting surface 13 of the objective mirror 12 is a section of a cylinder with a surface shape designed to image a distant object onto a line. Note that the reflecting surface 13 has optical power in only one direction; in the other direction, it effectively functions as a plane mirror with no optical power.

Note that the reflecting surface 13 may have a thin film coating that increases the overall reflectance of the mirror, such as a dielectric thin film stack or a thin metallic coating. Alternatively, the thin film coating may enhance the spectral distribution of the reflected light. For instance, the coating may deliberately reduce the reflectance of a particular wavelength or wavelength band, while maintaining a high reflectance for other wavelengths or wavelength bands.

Note that the objective mirror 12 performs off-axis imaging of an incident collimated beam onto a line focus. A preferred shape for the reflecting surface 13 is a parabolic cylinder (or a cylindrical parabola). In other words, the cross-sectional profile of the mirror 12 is a parabola. The parabolic profile surface nominally eliminates spherical aberration, which is an on-axis aberration that degrades performance uniformly across the field of view. Furthermore, since there are minimal off-axis field angles in the spectral dimension, the parabola substantially reduces or eliminates all aberrations in the slit imaging optics other than those stemming from manufacturing and alignment imperfections. Note that other shapes for the reflecting surface may be used, such as a cylindrical asphere, a cylindrical sphere, or a generalized cylindrical conic.

These anamorphic mirrors may be fabricated using single-point diamond turning due to their complex shape. The residual surface roughness created by the single-point diamond turning technique is acceptable for use in the visible and infrared wavelength spectrum, although it may not be suitable for use in the ultraviolet spectrum.

Although the use of a mirror as the objective is preferred because a mirror does not introduce any chromatic aberrations, note that a cylindrical lens may also be used as an objective. Such a cylindrical lens has optical power in only one direction, and is preferably made from at least two different optical materials so that chromatic aberrations may be reduced. A cylindrical lens may have an aspheric, spherical, parabolic, or generalized conic profile along one dimension, and may have such profiles on one or more surfaces on the lens. Note that a cylindrical objective lens may be used on-axis, with the optical axis passing symmetrically through the center of the lens on both sides of the lens. In contrast, the objective mirror 12 is designed to work off-axis.

The light reflecting off the objective mirror 12 comes to a line focus located at a slit 16 in a screen 15. The slit 16 functions as a field stop along one dimension in the optical system, known as the spectral dimension, allowing rays from only a relatively narrow slice of the distant object to pass through the optical system. Both the slit 16 and the narrow slice of the object are preferably oriented parallel to the cylindrical axis of the objective mirror 12, as seen in FIG. 1, and perpendicular to the scan direction.

Rays 14A and 14B that pass through the slit 16 strike a second cylindrical mirror 17, which has its cylindrical axis generally parallel to the slit 16. The reflecting surface 18 of the mirror may be a parabolic cylinder, similar to the reflecting surface 13 of the objective mirror 12, although the angle between incident and exiting beams need not be the same as for the objective mirror 12. The rays 19A and 19B that reflect off the cylindrical mirror 17 are substantially collimated, and may or may not be parallel to the incident rays 11A and 11B. The reflecting surface 18 may also have a thin film coating such as a high-reflectivity thin film stack or a metallic coating to enhance the reflectivity of the mirror, or enhance certain portions of the spectrum of the reflected beam.

The substantially collimated rays 19A and 19B strike a diffraction grating 20. As drawn in FIG. 1, the grating 20 is a reflection grating, although a transmission grating may be used as well. Alternatively, one or more dispersive optical elements may be used alone or in combination, such as a prism or a grating. The grating surface 21 is preferably located on the front of the grating 20, so that the beam does not substantially enter the grating substrate. Alternatively, the grating surface may be located on the back of the grating.

Note that the grating 20 is preferably substantially flat. A reflection off such a substantially flat grating does not introduce any off-axis aberrations into the beam, regardless of the field of view and regardless of the degree of collimation of the incident beam. In this respect, a flat grating is preferable to a curved grating, which may also be used.

The rays 22A and 22B that reflect off the grating are substantially collimated, but spectrally divergent, meaning that different wavelengths propagate at different angles. In other words, each wavelength component is individually collimated after reflection, but propagates in a slightly different direction from the other wavelength components. Since 22A and 22B are drawn parallel to one another, they both represent the same wavelength. As drawn in FIG. 1, the lines on the grating surface 21 are substantially vertical, and the spectral divergence in the reflected rays 22A and 22B is oriented in a plane perpendicular to the grating lines. In general, it is preferable that the grating lines are oriented parallel to the slit 16 and the cylindrical axes of the mirrors 12 and 17.

Mathematically, the diffracted orders obey the well-known grating equation:

$$d(\sin \psi + \sin \theta) = m\lambda, \quad m = 0, \pm 1, \pm 2, \tag{1}$$

where d is the spacing between adjacent grating lines, $\psi$ is the angle of incidence, $\theta$ is the angle of reflection, m is the diffracted order number, and $\lambda$ is the wavelength of the incident light. The reflected rays 22A and 22B are in a non-zero diffracted order, generally the plus or minus first order. Note that the zeroth order would show no spectral effects at all; the angle of incidence would equal the angle of reflection for all wavelengths. Note also that for a transmission grating, the same equation holds but $\theta$ is the angle of transmission. In all cases, both $\psi$ and $\theta$ are defined with respect to the surface normal. Note that the angle of incidence as drawn in FIG. 1 is fairly large. This is not strictly a requirement of the grating orientation, and angles of incidence may vary from normal incidence to near-grazing incidence. The grating is preferably designed to maximize its output into a particular diffracted order and reduce the power output into the other orders. Note that the grating design process itself is well-known to one of ordinary skill in the art and therefore is not discussed further.

The collimated and spectrally divergent rays 22A and 22B pass through a lens 23 to become focused and spectrally divergent rays 24A and 24B. The grating 20 is preferably located at the front focal plane of the lens 23, which would make the system spectrally telecentric. This is desirable, but not strictly necessary for operation. Note that FIG. 1 is not drawn to scale.

The lens 23 is preferably well corrected for chromatic aberrations, and preferably has reduced wavefront aberrations and a flat field. Such a lens may be composed of multiple elements from a combination of materials. Unlike the mirrors 12 and 17, the lens 23 may be rotationally symmetric, with substantially equal optical powers along the two directions. Alternatively, the focusing unit may be catadioptric, or may have one or more reflective surfaces arranged in an offset formation. The reflective surfaces may be concave, or a combination of concave and convex.

The focused and spectrally divergent rays 24A and 24B are focused by the lens 23 onto a multi-element detector 25 located essentially at the rear focal plane of the lens 23. The multi-element detector 25 may be preferably a CCD camera, with a two-dimensional array of sensors. In the direction perpendicular to the grating lines, the detector 25 senses the spectral distribution of the object under test, with each pixel corresponding to a particular range of wavelengths. In the direction parallel to the grating lines, the detector 25 senses the spatial distribution of the object; the pattern formed on the detector is essentially an image of a long, skinny slice of the object. Although the detector 25 is drawn in FIG. 1 as short and wide, the detector 25 may also be tall and narrow, or square, or may have other suitable shapes.

Figure 2:
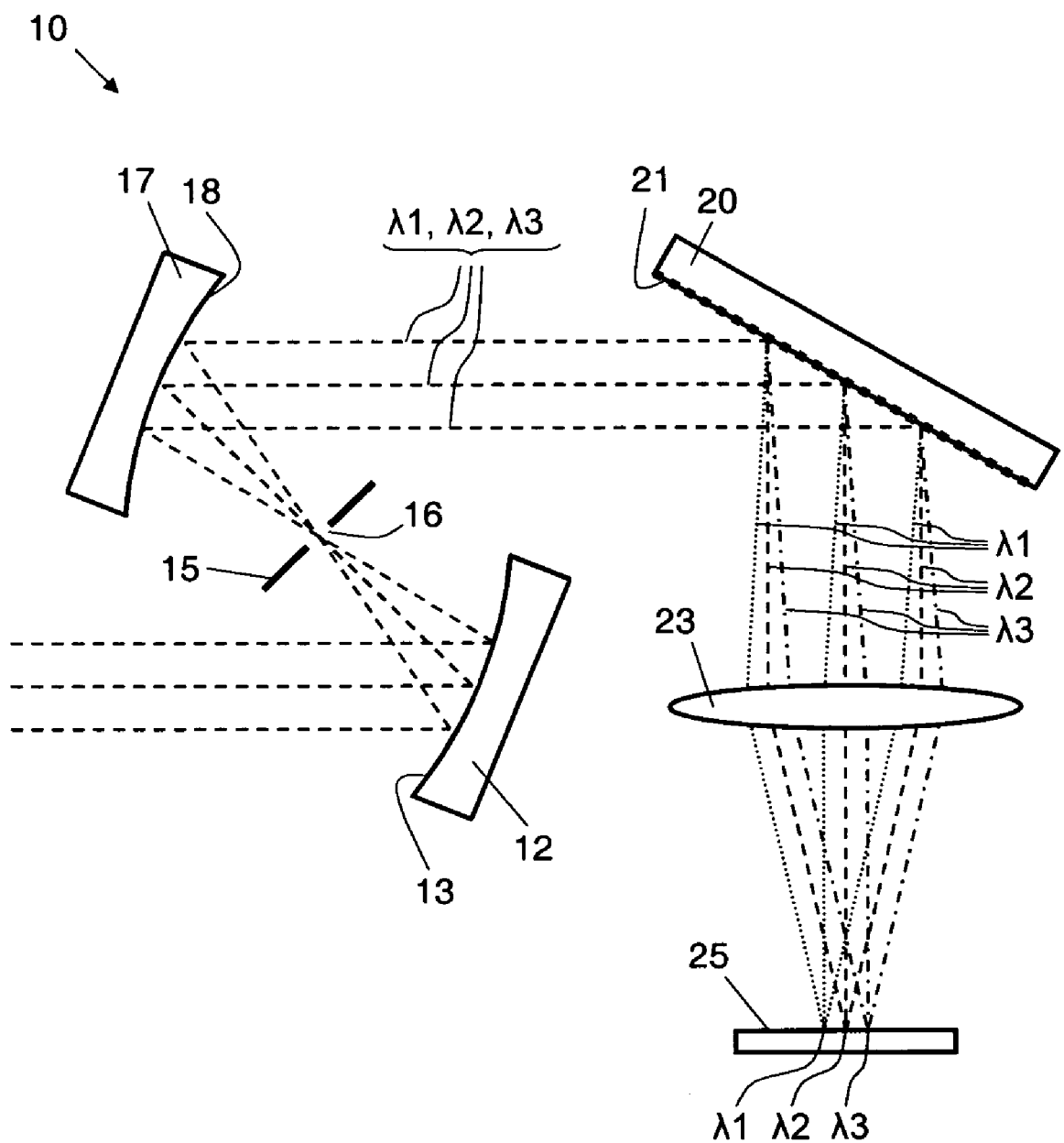
FIG. 2 is a plan drawing of the spectral plane of the imaging spectrometer of FIG. 1.

FIG. 2 shows the imaging spectrometer 10 of FIG. 1 from "above, looking down". In this orientation, the spectral effects are seen most clearly, and the plane of the page in FIG. 2 may therefore be referred to as the spectral plane or spectral dimension. The light from the distant object (not shown) having wavelengths $\lambda 1$, $\lambda 2$ and $\lambda 3$ enters the spectrometer from the left, as shown in FIG. 2. The incident beam is drawn as three dotted lines or rays, all of which originate from the same object point and have a particular spectral distribution corresponding to the spectrum reflected by the particular object point. In other words, each ray of the incident beam contains many wavelengths.

The incident beam reflects off the objective mirror 12, passes through a slit 16 in a screen 15 that limits the field of view in the spectral plane, and is collimated by a second lens 17. The reflecting surfaces 13 and 18 of the mirrors are described above. After the beam is collimated by the second lens 17, each ray continues to have several wavelengths, designated as $\lambda 1$, $\lambda 2$ and $\lambda 3$. In practice, the spectral distribution is generally more of a continuum than discrete wavelengths, and the designation of the three spectral components $\lambda 1$, $\lambda 2$ and $\lambda 3$ is used only for brevity in FIG. 2.

The beam then reflects off the grating surface 21 of diffraction grating 20, where the grating lines are oriented into the page. After reflection, each spectral component $\lambda 1$, $\lambda 2$ and $\lambda 3$ is still collimated and propagates at its own particular angle away from the grating 20. Note that the angular spread of the light reflected from the grating 20 is substantially within the spectral plane, and that any spectral spreading that occurs perpendicular to the spectral plane is undesirable.

A lens 23 brings the beam to a focus onto the multi-element detector 25, where each wavelength $\lambda 1$, $\lambda 2$ and $\lambda 3$ is focused onto its own location on the detector 25. In the spectral plane, the detector 25 is segmented into pixels, with each pixel corresponding to a particular range of wavelengths. The output from each pixel (as a photovoltage or a photocurrent) is then proportional to the amount of optical power contained in the pixel's wavelength range. By recording the output from all of the pixels, the complete spectrum of the object is obtained, within the spectral range of the spectrometer 10.

As an example, consider a configuration in which the grating 20 and the detector 25 are located, respectively, at the front and rear focal planes of the lens 23. The spectral resolution $\Delta\lambda$ of the spectrometer is given approximately by:

$$\Delta\lambda=(d/m)(w/f_c+p/f_i), \quad (2)$$

where d is the center-to-center spacing of the lines in the grating, p is the center-to-center spacing of the pixels in the detector, w is the width of the slit, $f_c$ is the focal length of the collimating optics, $f_i$ is the focal length of the imaging optics, and m is the order in which the grating operates (m is generally 1). In the direction of the spectral plane, the width of the slit 16 is preferably large enough to allow an adequate amount of optical power to reach the detector 25, but small enough to limit the field of view in the spectral plane so that the spread (or spatial extent) of each wavelength component at the detector is sufficiently small to meet spectral resolution requirements.

Figure 3:
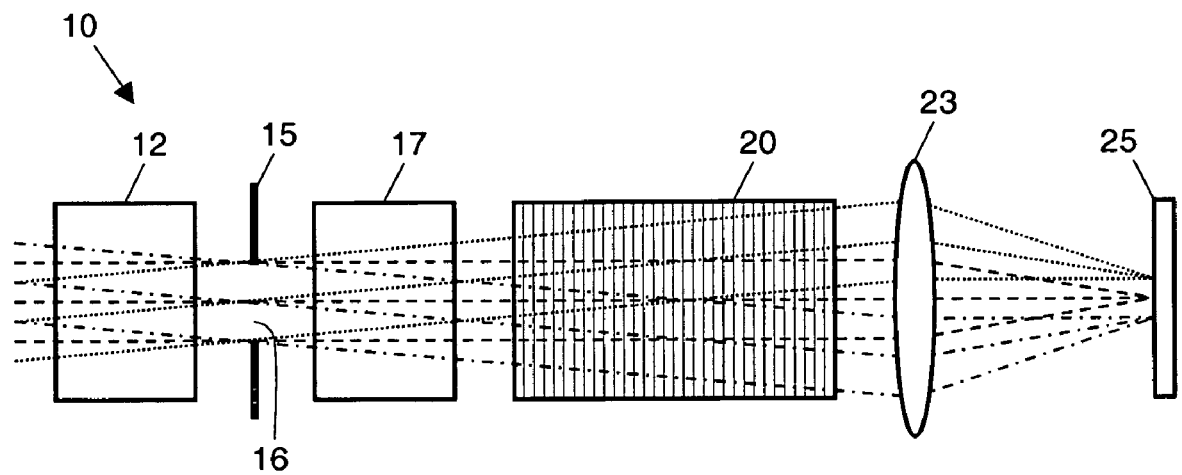
FIG. 3 is a plan drawing of the spatial plane of the imaging spectrometer of FIG. 1, where the slit is the aperture stop.

FIG. 3 shows a "side view" of the spectrometer 10 of FIG. 1, where the optical path is unfolded for clarity. This view shows the effects of the spatial imaging of the spectrometer 10, and the plane of FIG. 3 may be referred to as the spatial plane or spatial direction. Any spectral effects that occur in the spatial direction are generally undesirable, and may be reduced during alignment of the spectrometer components.

Light from the distant object (not shown) enters the spectrometer 10 from the left, as drawn in FIG. 3. Three rays are shown for each of three object points, with the square dot lines corresponding to a first object point, the dash lines corresponding to a second object point, and the dot dash lines corresponding to a third object point. Each set of three rays is drawn as collimated, because the object under test is sufficiently far away. Note that the object may be quite large in the spatial direction; the field of view (i.e., the full angle over which collimated rays may enter the spectrometer 10) may be significantly larger than for the spectral dimension.

The beam first reflects off the objective mirror 12. Because the objective mirror 12 has no optical power in the spatial direction, it acts like a plane mirror and has little effect on the beam. In the unfolded path shown in FIG. 3, the objective mirror 12 is seen to have little effect on the beam.

The beam then passes through the slit 16 in the screen 15. In the spatial dimension, the size of the slit 16 is much larger than in the spectral dimension. Note that the objective mirror 12 brings the incident beam to a line focus coincident with the slit 16. In the short dimension, the slit 16 acts as a field stop for the system, and the width should be chosen carefully to meet radiometric and resolution requirements of the spectrometer 10. In the long dimension, however, the slit 16 does not function as a field stop for the system (i.e., it is not conjugate with the detector in the spatial dimension, due to the presence of anamorphic elements in the system such as cylindrical lens 17).

After passing through the slit 16, the beam reflects off the second mirror 17 and the diffraction grating 20, both of which function substantially like plane mirrors in the spatial dimension. The beam is then focused by the lens 23 onto the detector 25. The image formed at the detector 25 along the spatial dimension is an image of the object, where bright and dark patterns on the object correspond to bright and dark patterns in the image along the spatial dimension (as opposed to the spectral pattern formed at the detector in the spectral dimension, discussed above).

Figure 4:
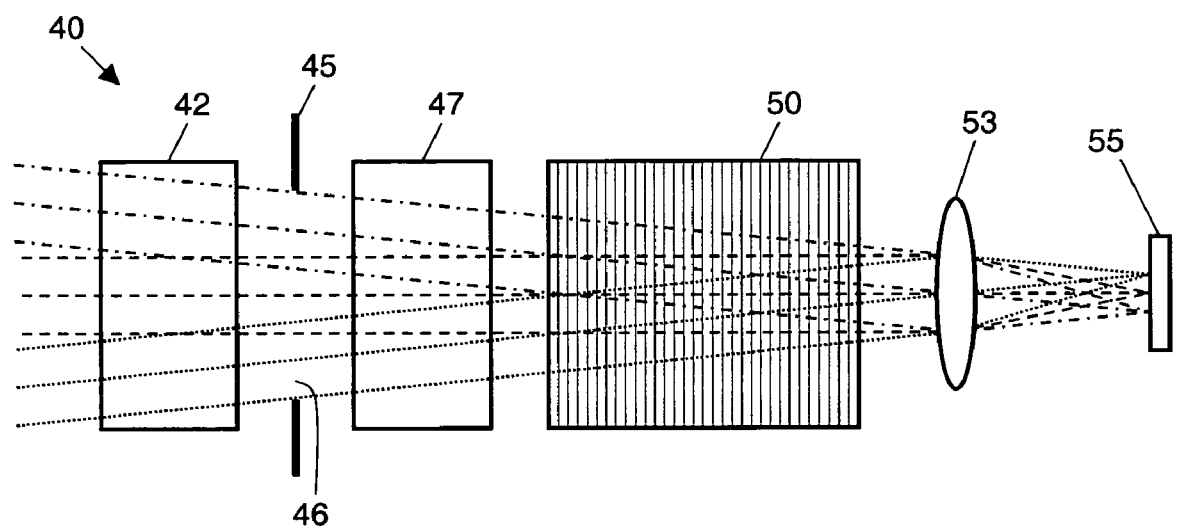
FIG. 4 is a plan drawing of the spatial plane of the imaging spectrometer of FIG. 1, where the lens is the aperture stop.

As drawn in FIG. 3, the slit 16 acts as an aperture stop, which in part determines the resolution of the image formed on the detector 25. Alternatively, the slit need not be the limiting aperture in the spatial dimension, and the aperture stop may be located at the grating or other optical element. Indeed, FiG. 4 shows an alternative arrangement in which the aperture stop is located at the lens. Note that the function of each of the optical elements in FIG. 4 is essentially the same as In FIG. 3, but the relative sizes of the elements may vary.

Light from the distant object (not shown) enters the spectrometer 40 from the left through an optional input aperture (not shown). The beam first reflects off the objective mirror 42, which acts like a plane mirror in the spatial direction. The beam then passes through the slit 46 in the screen 45, and reflects off the second mirror 47 and the diffraction grating 50, both of which function substantially like plane mirrors in the spatial dimension. The beam is then focused by the lens 53 onto the detector 55.

The performance of a typical prior art imaging spectrometer is limited by non-axial optical aberrations. Specifically, because most of the image is distant from the optical axis, off-axis aberrations such as coma, astigmatism, field curvature, distortion and lateral color all reduce the quality of the image and degrade the performance of the spectrometer. It is instructive to discuss the origins of off-axis aberrations in an imaging spectrometer, both for one type of known system and for the system described herein. Such a discussion reveals the source of a large portion of the off-axis aberrations in the known system, and shows that this source is absent from the system described herein. FIG. 5 shows a table summarizing this discussion.

In the known type of imaging spectrometer in which rotationally symmetric focusing optics are used on both sides of the slit, the beam is brought to a focus at the slit in both the spectral and spatial dimensions.

In the spectral dimension, the field of view is kept relatively small by using a deliberately narrow slit in the spectral dimension so that the range of incident angles on the grating is reduced, and this relatively small field of view limits the off-axis aberrations in the spectral dimension.

In the spatial dimension, where the field of view does not significantly affect the resolving power of the grating, the field of view is increased significantly beyond the spectral dimension by using a slit that is much wider in the spatial dimension than in the spectral dimension. In fact, in many cases it is desirable to have a large field of view in the spatial dimension, so that when the spectrometer is flown overhead, a large swath of the ground may be imaged by a single overhead pass of the aircraft. However, the performance of the prior art spectrometer may be limited by off-axis aberrations, generated by the focusing optics on both sides of the slit when used at large field angles. Furthermore, if the beam reflects off a curved grating, rather than a flat grating, the reflection may produce additional off-axis aberrations at the required field angles.

To more fully understand the imaging spectrometer described herein, it is instructive to consider each dimension separately. In the spectral dimension, shown most clearly in FIG. 2, the beam is brought to a focus at the slit, but the slit is kept deliberately narrow to limit the field of view, and off-axis aberrations become insignificantly small. Note that the anamorphic mirrors are designed to be essentially aberration-free at one particular field angle, and would show substantial off-axis aberrations if the field of view in the spectral dimension were extended beyond the width of the slit. But because the slit is relatively narrow, the mirrors operate only at the field angle at which they were designed and therefore show essentially no off-axis aberrations.

In the spatial dimension, shown most clearly in FIG. 3, note that the beam is not brought to a focus at the slit 16. The anamorphic mirrors 12 and 17 on either side of the slit 16 are cylindrical in nature, and have optical power in the spectral dimension (FIG. 2), but not the spatial dimension (FIG. 3). As a result, the beam remains generally collimated in the spatial dimension as it passes through the slit 16. The reflections off the mirrors 12 and 17 are optically equivalent to reflection off a plane mirror, which does not generate any substantial aberrations. As a result, the field of view in the spatial dimension may be increased without generating any off-axis aberrations, which is not the case for the known type of push-broom imaging spectrometer. In practicality, the field of view may be limited by vignetting, or truncation of the beam by one of the optical components. Accordingly, the field of view in the spatial dimension is designated as "large" in FIG. 5, compared with "small" for the spectral dimension.

Note that the field of view in the spatial dimension is typically a design specification of the spectrometer, and that a shrunk device, reduced in size to provide a smaller footprint, should still maintain roughly the same field of view as its un-shrunk counterpart. Hence, the spatial field of view for both devices is designated as "large" in FIG. 5.

The advantage of the imaging spectrometer described herein is apparent from the rightmost two columns in FIG. 5. Because a smaller device is desirable (maintaining the same field of view), the scalability of the design is important. In general, merely scaling the size of all the components proportionally proves unacceptable, in that the throughput of the device, and consequently the signal-to-noise ratio, is unacceptably reduced. It is preferable that the entrance pupil and the focal plane array remain roughly the same size while the focal lengths and spacings of the optical components decrease. As a result, the numerical aperture (NA) of the system increases, or equivalently, the F-number of the system decreases, resulting in an increased sensitivity to off-axis aberrations. Because the device of FIGS. 1–4 shows no off-axis aberrations in either dimension of any component other than the focusing lens, it may be scaled down to form a smaller device with relatively little deterioration of performance, unlike the known device.

Figure 6:
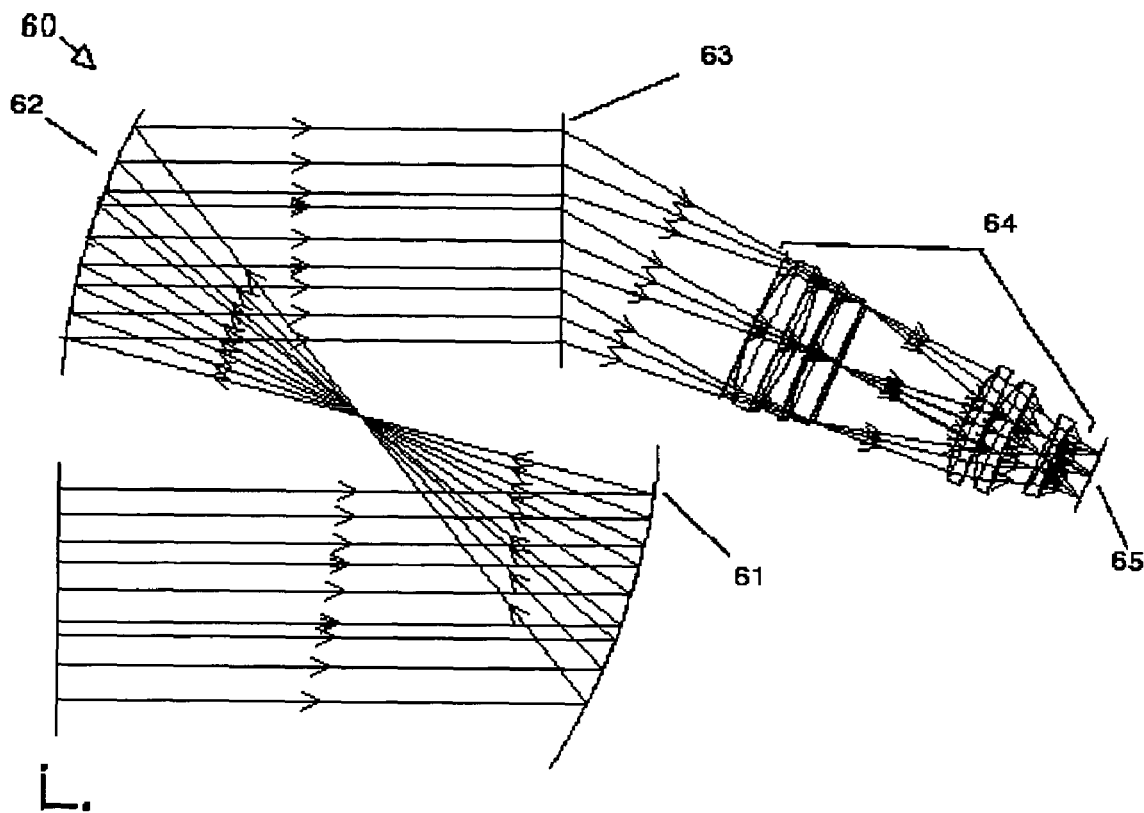
FIG. 6 is a plan drawing of the spectral plane of an imaging spectrometer that uses anamorphic optical elements in conjunction with a photographic lens.
Figure 7:
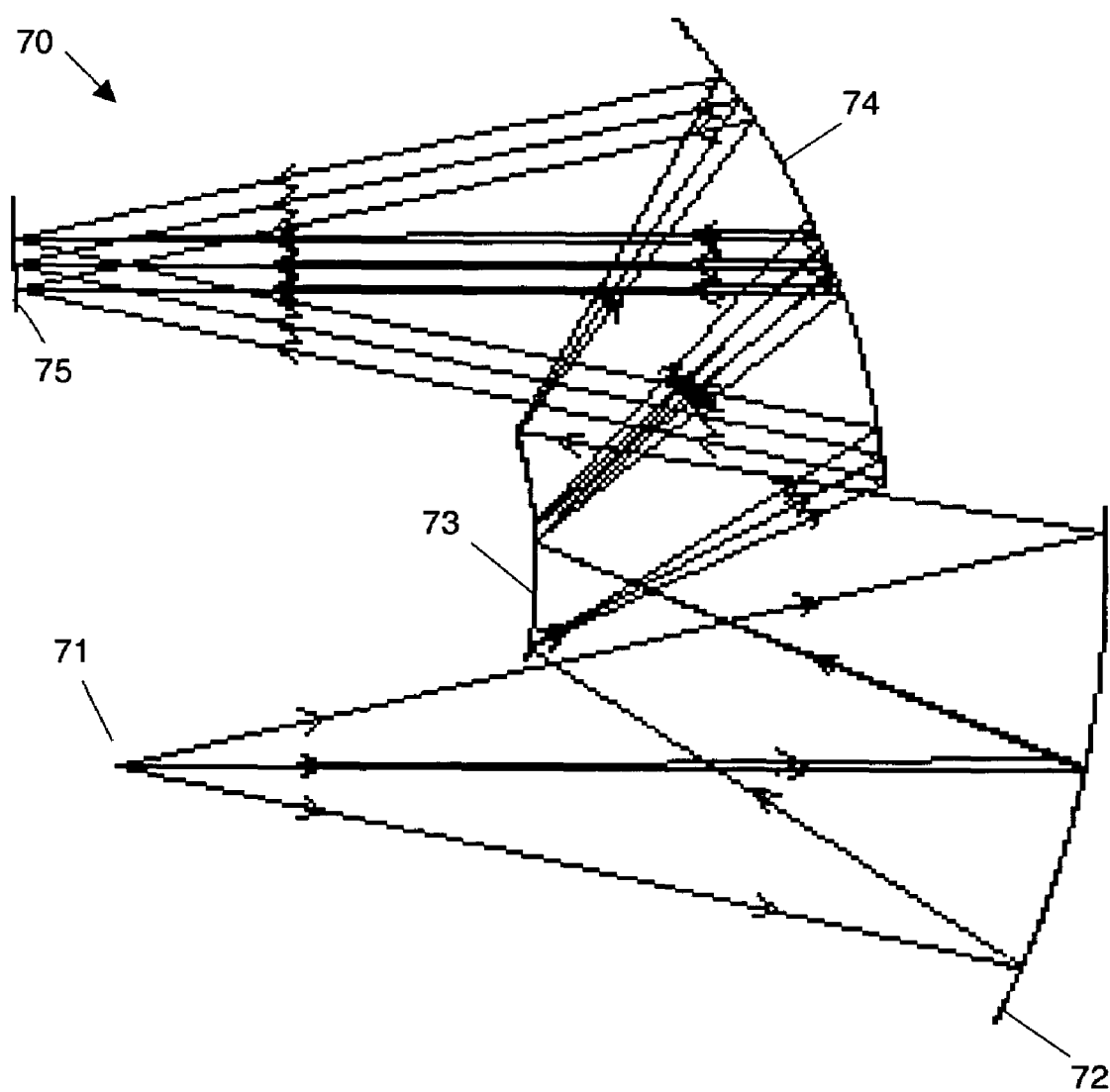
FIG. 7 is a plan drawing of a prior art imaging spectrometer.

FIGS. 6 and 7 show raytracing examples of the imaging spectrometer described herein and a prior art system, respectively. Both show the optical path in the spectral dimension. Additionally, both are drawn to scale with respect to each other, and both show systems with generally comparable performance. A comparison between the two figures shows that the system shown in FIG. 6 is significantly smaller than the prior art system of FIG. 7, based on comparable performance, described in further detail below.

Both systems have the following five performance parameters in common: (1) entrance pupil diameter=16.67 mm, (2) spectral range=470–730 nm, (3) object distance=100 m, (4) field of view=14°, and (5) width of spectrum on image plane=4.8 mm. The last two parameters are set so that the image plane dimensions match those of a 0.5-inch CCD when a 25 mm lens is used as the focusing optic. These parameters are merely exemplary, and simply provide a basis for comparison between the two systems; they are not intended to limit or constrain the imaging spectrometer described herein.

The system shown in FIG. 6 is similar in layout to the view of FIG. 2 except that a transmission rather than a reflection diffraction grating is used for light dispersion. Also, the system of FIG. 6 utilizes a 5-element Petzval lens such as disclosed in, for example, U.S. Pat. No. 3,255,664, issued Jun. 14, 1966 to Warren J. Smith, which is hereby incorporated by reference in its entirety, with the lens scaled to have a 25 mm focal length. Light reflects off a distant object (not shown) to arrive at the spectrometer 60 as essentially collimated. As in FIG. 2, the light enters the spectrometer 60 from the lower left corner of the figure. The light is brought to a line focus and is recollimated by a pair of cylindrical mirrors 61 and 62. As discussed above, each cylindrical mirror has a generally parabolic cross section and operates with essentially no on-axis aberrations. Note that the field angle in the spectral dimension is determined by the width of the slit (not shown), which for computer modeling purposes, is negligibly small. The collimated light then passes through a transmission diffraction grating 63, which breaks the beam into its spectral components to form a spectrally divergent, collimated beam. As in FIG. 2, three distinct spectral components are shown for each ray incident on the grating 63. Note that in practice, the spectrum is generally a continuum, rather than discrete spectral lines. The spectrally divergent, collimated beam passes through the lens 64 noted above. The lens 64 focuses the spectral components onto a detector plane 65. Note that the aperture stop is located at its normal position within the lens 64, which results in the best possible image quality in the context of this example.

Two performance parameters of the spectrometer are image quality and size. A typical measure of the performance of the spectrometer is the average root-mean-squared (RMS) wavefront error, where the average is taken over all wavelengths and field angles. For the layout shown in FIG. 6, the RMS wavefront error is 0.37 waves at a wavelength of 0.6328 µm. Most of the wavefront error is attributed to aberrations generated by the focusing lens 64, although the parabolic cylindrical mirrors 61 and 62 generate small additional contributions owing to the imperfectly collimated light. Based on this RMS wavefront error threshold, the layout of FIG. 6 fits inside a volume of 298 cubic centimeters.

In order to demonstrate that the system shown in FIG. 6 may be smaller than other known spectrometer designs, a raytrace of a comparable prior art system is shown in FIG. 7. The layout of FIG. 7 is commonly known as an Offner mirror system, and is described more fully in U.S. Pat. No. 5,880,834. Light reflects off a distant object (not shown) and arrives at the spectrometer 70 essentially collimated. The light is then brought to a line focus by a rotationally symmetric objective lens, which is also not shown in FIG. 7. For the purposes of raytracing, the objective lens is modeled as a perfect lens, which forms a completely aberration-free line focus 71. The focal length of this perfect lens was set at 35 mm rather than the 25 mm focal length used in the preceding example. A 25 mm focal length in conjunction with a 16.67 mm entrance pupil diameter gives the lens an F-number of 1.5, which exceeds what the Offner design can effectively handle.

Light diverging from the line focus 71 strikes a mirror 72, which directs a diverging reflection toward a curved reflection grating 73. Note that the mirror 72 is rotationally symmetric and has optical power in both dimensions, compared to the anamorphic mirror 17 between the slit and the grating, which has optical power in only one dimension. The light reflected from the curved reflection grating 73 is spectrally divergent, and is represented as such by three discrete spectral components, in a similar manner to that of FIG. 6. In practice, the spectrum is generally continuous rather than discrete. The light reflected from the grating 73 reflects off a mirror 74 and is brought to a focus on a detector plane 75.

Based on the five performance parameters detailed above, the Offner system of FIG. 7 is scaled down until its performance matches that of the system shown in FIG. 6, which is an RMS wavefront error of 0.37 waves at a wavelength of 0.6328 µm. The resulting scaled system is shown in FIG. 7, which uses the same size scale as FIG. 6.

Without including the space occupied by the objective lens (not shown in FIG. 7), the volume of this design is still 476 cubic centimeters. In other words, the scalability of the system shown in FIG. 6 is such that a comparable prior art system, scaled down until its performance matches that of the FIG. 6 system, occupies a volume nearly fifty percent larger. In each of these cases, the volumes stated exclude space necessary for support components common to both designs. The comparison would favor the FIG. 6 system even more if a higher performance lens were used as its focusing optic or if room for an objective lens were included in the volume of the Offner design.

For the system of FIGS. 1–4, the performance is typically limited by distortion generated by light dispersion of the diffraction grating. Although the dispersion generated by a flat grating is essentially free from point imaging aberrations, there are two residual grating distortions that are well-known in the field of hyperspectral imaging. One distortion is known as smile, where smile is a change in the dispersion angle with field position. The other distortion is known as keystone, which is a change in the magnification of the field of view with the spectral channel. Smile and keystone may prevent the spectral and spatial information on the scene of interest from lining up in neat rows, which in turn may create difficulty in interpretation of the imaged data. Smile and keystone may be accounted for in software, or may also be corrected optically by using a field flattening lens.

Additionally, keystone may also be corrected by used of a tilted image plane in conjunction with a lens specifically designed to image chromatically dispersed light on a tilted image plane. An exemplary system that may be used to correct for keystone is disclosed in U.S. Pat. No. 6,552,788, issued Apr. 22, 2003 to Kenneth R. Castle.

There are several possible alternates for the grating/lens elements, in addition to the flat grating 20 and lens 23 shown in FIGS. 1–3. One alternative is use of a curved grating, which separates the beam into its spectral components as well as focusing the beam onto the detector. Such a curved grating would replace the flat grating 20 and lens 23 in the system of FIGS. 1–3. In general, curved gratings are more expensive than flat gratings and are subject to point imaging aberrations, but they reduce the number of system components and hence save space, and their use may be desirable if the overall cost of the system's components, mounts, and assembly procedures is reduced. In a further alternative, a curved grating may be used to combine the functions of the flat grating 20 and the anamorphic mirror 17.

Figure 8:
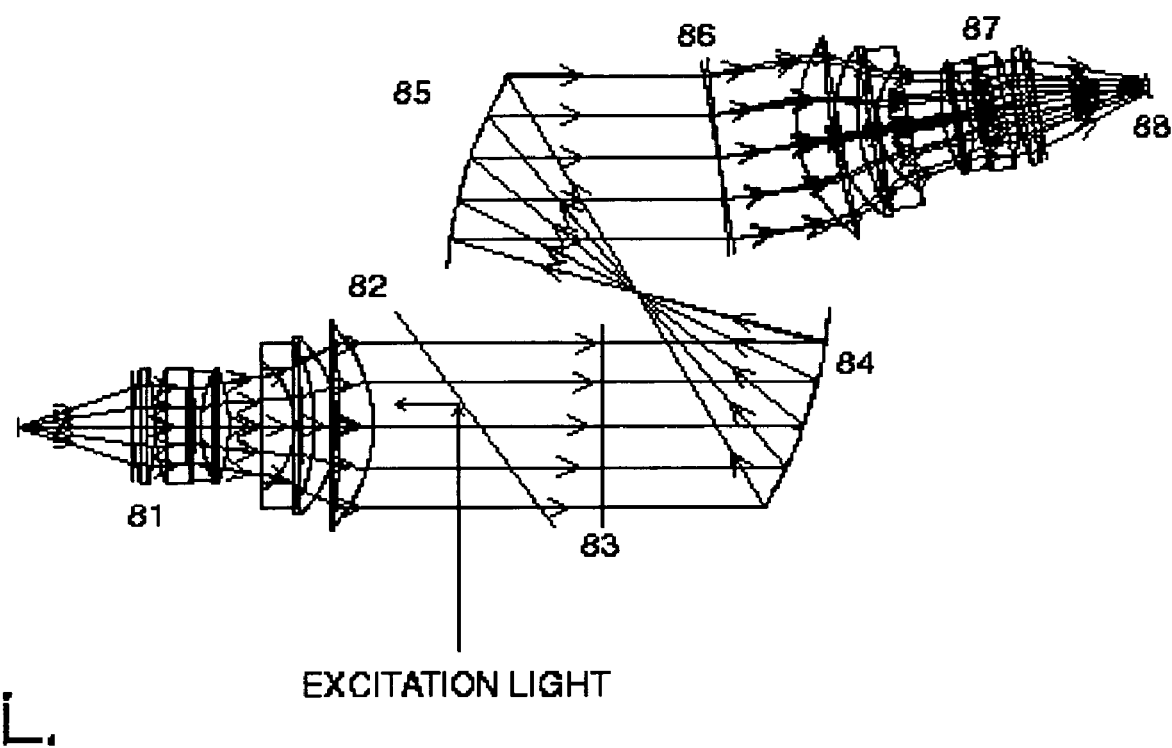
FIG. 8 is a plan drawing of the spectral plane of an exemplary imaging spectrometer that uses a photographic front collimating lens and an identical imaging lens.

FIG. 8 shows an exemplary system of the near-field type that is particularly suitable for use in fluorescence imaging. The system of FIG. 8 is similar to the systems of FIGS. 1–4 as modified by the addition of a collimating lens 81 to the front end. The sample under test is placed at the focal plane of the collimating lens. The light collected from the sample is collimated by the collimating lens, then passes through the remainder of the system in the same manner as essentially light from a distant object.

The collimating lens should preferably be free from chromatic aberration, should be essentially free from monochromatic aberrations such as spherical aberration, coma, astigmatism and distortion, and should have an essentially flat field. Suitable collimating lenses are well known in the art, and an example of a suitable lens is disclosed in U.S. Pat. No. 5,627,686, issued May 6, 1997 to Koichi Ohshita. Here, the lens is scaled to have a focal length of 100 mm. As used in the spectrometer, the collimation lens 81 is positioned in reverse of its usual direction so that light from an object positioned at the focal plane (i.e., film plane) of the lens exits from the lens in collimated form.

If bright-field illumination of the sample is required, as in fluorescence imaging, the illuminating beam may be delivered to the sample through the collimating lens, with the addition of a beamsplitter between the collimating lens and the cylindrical elements. As shown in FIG. 8, light from an excitation source, such as a laser or mercury arc lamp, enters into the system via a beamsplitter 82, which directs it through the collimation lens 81 and onto the sample. Fluorescent light emitted from the sample then passes through the collimation lens 81, beamsplitter 82, and a filter 83, which blocks light from the excitation source but permits passage of fluorescent light from the sample. Suitable beamsplitters and filters are well-known in the art; see, for example, Michael B. Sinclair. Jerilyn A. Timlin. David M. Haaland and Margaret Werner-Washburne, "Design, Construction, Characterization, and Application of a Hyperspectral Microarray Scanner," Applied Optics, Apr. 2004, pp. 2079–2088, Volume 43, Issue 10.

After fluorescent light passes through filter 83, the light beam passes through the remaining train of optical components much as it does in the systems of FIGS. 1–4. The light is brought to a line focus and is recollimated by a pair of cylindrical mirrors 84 and 85, each of which has a generally parabolic cross section and operates with essentially no on-axis aberrations. Furthermore, the field in the spectral dimension is determined by the width of the slit (not shown) between the mirrors, which is negligibly small. The collimated light then passes through a holographic transmission grating 86, which breaks the beam into its spectral components to form a spectrally divergent, collimated beam. As in FIG. 6, three distinct spectral components are shown for each ray incident on the grating 86. The spectrally divergent, collimated beam passes through the lens 87 noted above. The lens 87 focuses the spectral components onto a detector plane 88. The aperture stop is located at its normal position within the focusing lens 87, which provides for the optimal image quality within the context of this example.

The system shown in FIG. 8 is especially useful as a hyperspectral imaging system, providing high-resolution, large aperture imaging of macro-scale objects such as 2D gels and multi-well plates. A large aperture is needed in such a system due to the low levels of fluorescent light typically emitted in the fluorescence emission process. Consequently, the system in FIG. 8 is modeled with a numerical aperture NA of 0.316, or, equivalently, an F-number of 1.5. Additionally, the system should have a reasonably large field of view in the spatial dimension so that it can be used to analyze a 2D gel, commonly 200 mm by 200 mm, or a multi-well plate of normal size within a reasonable period of time. The exemplary system shown in FIG. 8 has a field of view of 6.4 mm. The resolution of the system is determined primarily by the performance of the focusing and imaging lenses, 81 and 87.

In the context of this example, spatial resolution is most conveniently measured in terms of RMS spot radius, which averages 27 µm over the three wavelengths (486, 587, and 656 nm) and the three field positions, (on-axis, 2.3 mm off-axis and 3.2 mm off-axis) used in the example. While this level of performance is quite satisfactory for many applications, it may be improved for more demanding applications by modifying the design of the focusing and collimating lenses in a manner well known in the art.

Note that it is preferable to use a rotationally symmetric collimating element such as the lens 81, which has equal powers in the x- and y-directions, with a cylindrical objective element such as the mirror 84, which has power in only x or y. When used in this manner, it is preferable to use the collimating element at infinite conjugates, meaning that the beam between the collimating element and the cylindrical objective element is essentially collimated. This collimated beam from the collimating lens 81, which is incident on the cylindrical objective mirror 84, is completely analogous to the essentially collimated beam from a distant object, which is incident on the cylindrical objective mirror 12 as shown in FIGS. 1–3.

As an alternative to use at infinite conjugates, the collimating lens may be used at finite conjugates, meaning that the beam between the collimating and objective lenses is not collimated, but is diverging or converging.

As another alternative, the collimating lens may have an anamorphic component, meaning that it has different powers in the x- and y-directions.

As a further alternative, the functions of the collimating and objective elements may be combined in a single element, which images one dimension of the object onto the slit and collimates the other dimension.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A device for generating spectral information over an elongated portion of an object, comprising:
    means for forming an anamorphic beam corresponding to a slice of the object, the anamorphic beam being generally focused within a slit in a first dimension, and generally collimated within the slit in a second dimension;
    means for forming a multi-wavelength substantially collimated beam from the anamorphic beam;
    means for forming a spectrally divergent focused beam from the multi-wavelength substantially collimated beam; and
    means for sensing the spectrally divergent focused beam in the first and second dimensions, wherein the first dimension comprises primarily spectral information about the object slice, and the second dimension comprises primarily spatial information about the object slice.

2. The device of claim 1, wherein the object is distant and the anamorphic beam forming means comprises means for forming the anamorphic beam from a substantially collimated beam from the object.

3. The device of claim 1, wherein the object is near and the anamorphic beam forming means comprises means for forming the anamorphic beam from a substantially divergent beam from the object.

4. A method of generating spectral information over an elongated portion of an object, comprising:
  forming an anamorphic beam corresponding to a slice of the object, the anamorphic beam being generally focused within a slit in a first dimension, and generally collimated within the slit in a second dimension;
  forming a multi-wavelength substantially collimated beam from the anamorphic beam;
  forming a spectrally divergent focused beam from the multi-wavelength substantially collimated beam; and
  sensing the spectrally divergent focused beam in the first and second dimensions, wherein the first dimension comprises primarily spectral information about the object slice, and the second dimension comprises primarily spatial information about the object slice.

5. The method of claim 4, wherein the object is distant and the anamorphic beam forming step comprises forming the anamorphic beam from a substantially collimated beam from the object.

6. The device of claim 4, wherein the object is near and the anamorphic beam forming step comprises forming the anamorphic beam from a substantially divergent beam from the object.

7. The method of claim 4, wherein the spectrally divergent focused beam forming step comprises:
  forming a spectrally divergent collimated beam from the multi-wavelength substantially collimated beam; and
  forming the spectrally divergent focused beam from the spectrally divergent collimated beam.

8. A method of generating spectral information over an elongated portion of an object, comprising:
  applying an incident beam containing spatial and spectral information about a slice of the object to an anamorphic objective element to form a first anamorphic beam;
  passing the first anamorphic beam through a slit to form a second anamorphic beam corresponding to the object slice, the first anamorphic beam being generally focused within the slit in a first dimension, and generally collimated within the slit in a second dimension;
  applying the second anamorphic beam to an anamorphic recollimating element to form a multi-wavelength substantially collimated beam;
  forming a spectrally divergent focused beam from the multi-wavelength substantially collimated beam; and
  sensing the spectrally divergent focused beam in the first and second dimensions, wherein the first dimension comprises primarily spectral information about the object slice, and the second dimension comprises primarily spatial information about the object slice.

9. The method of claim 8, further comprising receiving the incident beam from a distant object, the incident beam being substantially collimated.

10. The method of claim 8, further comprising:
  receiving a diverging beam from a near object; and
  collimating the diverging beam to form the incident beam.

11. The method of claim 8, wherein the spectrally divergent focused beam forming step comprises:
  applying the multi-wavelength substantially collimated beam to a diffraction grating to form the spectrally divergent collimated beam; and
  applying the spectrally divergent collimated beam to a focusing unit to form the spectrally divergent focused beam.

12. An imaging spectrometer, comprising:
  an anamorphic objective element for forming an anamorphic beam from an incident beam, the anamorphic objective element having an anamorphic intermediate focus;
  a substantially opaque screen having an elongated slit disposed substantially coincident with the anamorphic intermediate focus for screening the anamorphic beam;
  an anamorphic recollimating element for forming a multi-wavelength substantially collimated beam from the screened anamorphic beam;
  a diffraction grating for forming a spectrally divergent collimated beam from the multi-wavelength substantially collimated beam, the diffraction grating having grating lines substantially parallel to the elongated slit;
  a focusing unit for forming a spectrally divergent focused beam from the spectrally divergent collimated beam, the focusing unit having a rear focal plane; and
  a two dimensional sensor disposed at the rear focal plane of the focusing unit for receiving the spectrally divergent focused beam, a first one of the dimensions being oriented perpendicular to the grating lines to obtain spectral information about the incident beam, and a second one of the dimensions being oriented parallel to the grating lines to obtain spatial information about the incident beam.

13. The imaging spectrometer of claim 12, wherein the incident beam is a substantially collimated beam from a distant object.

14. The imaging spectrometer of claim 12, further comprising a collimating element for forming the incident beam as a substantially collimated beam from a substantially divergent beam from a near object.

15. The imaging spectrometer of claim 14 wherein the collimating element has an anamorphic component.

16. The imaging spectrometer of claim 12, wherein:
  the incident beam is a substantially diverging beam from a near object; and
  the anamorphic objective element comprises a collimating property for collimating one dimension of the near object along a length of the elongated slit, the other dimension of the near object being focussed within the elongated slit.

17. The imaging spectrometer of claim 12, wherein the anamorphic objective element and the anamorphic recollimating element have optical power along the first dimension and not along the second dimension.

18. The imaging spectrometer of claim 17, wherein the anamorphic objective element and the anamorphic recollimating element are mirrors.

19. The imaging spectrometer of claim 17, wherein the anamorphic objective element and the anamorphic recollimating element have a reflecting surface shaped as a parabolic cylinder.

20. The imaging spectrometer of claim 13, further comprising:
  an input aperture, wherein the elongated slit establishes a elongated field of view through the input aperture; and
  means for translating the elongated field of view across an object greater than about 100 meters distant from the input aperture.

21. The imaging spectrometer of claim 12, wherein the diffraction grating is reflective.

22. The imaging spectrometer of claim 12, wherein the focusing unit is a lens.

23. The imaging spectrometer of claim 12, wherein the focusing unit has at least one reflective surface arranged in an offset formation.

24. The imaging spectrometer of claim 12, wherein the two dimensional sensor is a CCD camera.

25. An imaging spectrometer, comprising:
an anamorphic objective element having an anamorphic intermediate focus;
a substantially opaque screen having an elongated slit disposed substantially coincident with the anamorphic intermediate focus;
an anamorphic recollimating element optically coupled to the anamorphic objective element through the elongated slit of the screen;
a diffraction grating optically coupled to the anamorphic recollimating element, the diffraction grating having grating lines substantially parallel to the elongated slit of the screen;
a focusing unit optically coupled to the diffracting grating and having a rear focal plane; and
a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

26. The imaging spectrometer of claim 25, wherein the anamorphic objective element is for forming the anamorphic beam from a substantially collimated beam from a distant object incident thereon.

27. The imaging spectrometer of claim 25, further comprising:
a collimating element for forming a substantially collimated beam from a substantially divergent beam from a near object incident thereon;
wherein the anamorphic objective element is for forming the anamorphic beam from the substantially collimated beam incident thereon from the collimating element.

28. An imaging spectrometer, comprising:
an anamorphic objective element having an anamorphic intermediate focus;
a substantially opaque screen having an elongated slit disposed substantially coincident with the anamorphic intermediate focus;
an anamorphic recollimating element optically coupled to the anamorphic objective element through the elongated slit of the screen;
a curved diffraction grating optically coupled to the anamorphic recollimating element, the curved diffraction grating having grating lines substantially parallel to the elongated slit of the screen, and further having a rear focal plane;
a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

29. The imaging spectrometer of claim 28, wherein the anamorphic objective element is for forming the anamorphic beam from a substantially collimated beam from a distant object incident thereon.

30. The imaging spectrometer of claim 28, further comprising:
a collimating element for forming a substantially collimated beam from a substantially divergent beam from a near object incident thereon;
wherein the anamorphic objective element is for forming the anamorphic beam from the substantially collimated beam incident thereon from the collimating element.

31. An imaging spectrometer, comprising:
an anamorphic objective element having an anamorphic intermediate focus;
a substantially opaque screen having an elongated slit disposed substantially coincident with the anamorphic intermediate focus;
an anamorphic diffraction grating optically coupled to the anamorphic objective element through the elongated slit of the screen, the anamorphic diffraction grating having grating lines substantially parallel to the elongated slit of the screen;
a focusing unit optically coupled to the anamorphic diffracting grating and having a rear focal plane; and
a multi-dimensional sensor disposed at the rear focal plane of the focusing unit, a first one of the dimensions being a spectral dimension oriented perpendicular to the grating lines, and a second one of the dimensions being a spatial dimension oriented parallel to the grating lines.

32. The imaging spectrometer of claim 31, wherein the anamorphic objective element is for forming the anamorphic beam from a substantially collimated beam from a distant object incident thereon.

33. The imaging spectrometer of claim 31, further comprising:
a collimating element for forming a substantially collimated beam from a substantially divergent beam from a near object incident thereon;
wherein the anamorphic objective element is for forming the anamorphic beam from the substantially collimated beam incident thereon from the collimating element.

34. A spectrometer for imaging an object, comprising:
a first optical path for light from the object;
an anamorphic objective element disposed in the first optical path for forming a first anamorphic beam from the light from the object, the anamorphic objective element having an anamorphic intermediate focus in a first dimension;
a second optical path for the first anamorphic beam;
an elongated slit generally disposed at the anamorphic intermediate focus in the second optical path for forming a second anamorphic beam corresponding to a slice of the object from the first anamorphic beam;
a third optical path for the second anamorphic beam;
an optical subsystem disposed in the third optical path for forming a focused beam from the second anamorphic beam, the focused beam being spectrally divergent and having primarily spectral information about the object slice in a first dimension, and having primarily spatial information about the object slice in a second dimension, the optical subsystem comprising an anamorphic recollimating element disposed in the third optical path for forming a multi-wavelength substantially collimated beam from the second anamorphic beam;
a fourth optical path for the focused beam; and
a sensor disposed in the fourth optical path, the sensor having a first dimension for sensing the spectral information in the first dimension of the focused beam, and having a second dimension for sensing the spatial information in the second dimension of the focused beam.

35. The imaging spectrometer of claim 34, wherein the optical subsystem further comprises:
  a fifth optical path for the multi-wavelength substantially collimated beam;
  a diffraction grating disposed in the fifth optical path for forming a spectrally divergent collimated beam from the multi-wavelength substantially collimated beam, the diffraction grating having grating lines substantially parallel to the elongated slit;
  a sixth optical path for the spectrally divergent collimated beam; and
  a focusing unit disposed in the sixth optical path for forming the focused beam from the spectrally divergent collimated beam, the focusing unit having a rear focal plane;
wherein the sensor is disposed at the rear focal plane of the focusing unit for receiving the focused beam.

36. The imaging spectrometer of claim 34 wherein the optical subsystem comprises:
  a seventh optical path for the second anamorphic beam; and
  a curved diffraction grating disposed in the seventh optical path for forming the focused beam from the multi-wavelength substantially collimated beam, the curved diffraction grating having grating lines substantially parallel to the elongated slit, and having a rear focal plane;
wherein the sensor is disposed at the rear focal plane of the curved diffraction grating for receiving the focused beam.

37. The imaging spectrometer of claim 34 wherein the object is near, further comprising a collimating lens for collimating diverging light from the near object and furnishing the collimated light from the near object to the first optical path.

38. The imaging spectrometer of claim 34 wherein the object is distant, further comprising an input aperture for admitting substantially collimated light from the distant object to the first optical path.

* * * * *